G. S. GARTH & W. ELDER.
WAGON-AXLE.

No. 176,743.                    Patented May 2, 1876.

Witnesses
Chas. Nida
H. E. Mattenberg

Inventors:
George Sutton Garth
and Wilson Elder.
per G. M. Plympton Atty.

UNITED STATES PATENT OFFICE.

GEORGE S. GARTH AND WILSON ELDER, OF MILL HALL, PENNSYLVANIA.

IMPROVEMENT IN WAGON-AXLES.

Specification forming part of Letters Patent No. 176,743, dated May 2, 1876; application filed March 23, 1875.

*To all whom it may concern:*

Be it known that we, GEORGE SUTTON GARTH and WILSON ELDER, of Mill Hall, in the county of Clinton and State of Pennsylvania, have invented a new and useful Improvement in Thimble-Skeins, Axles, &c.; and that the following is a full, clear, and exact description of the same, reference being had to the accompanying drawings, and to the letters of reference marked thereon, making a part of this specification.

This invention is in the nature of an improvement in thimble-skeins, axles, &c.; and the invention consists in the combination of a channeled axle or thimble-skein, a peculiarly-constructed washer fitting thereupon, and a key for locking them together, as hereinafter fully specified.

The difficulty experienced in keeping or confining the washers properly to the axle or thimble-skein is well known to the users of wagons, &c., the constant liability of the ordinary key or nut to jolt out of place permitting the washer and wheel to slip off the axle or skein. To prevent this class of accidents, and at the same time provide a means that will be equally applicable to retaining the wheels of vehicles of all kinds (as well as thimble-skeins) in a durable manner, and yet admit of their being readily removed when desired, is the main object of this invention, as will be seen from the following description and accompanying drawings, wherein—

Figure 1:
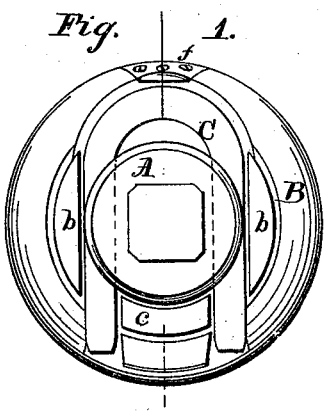
Figure 2:
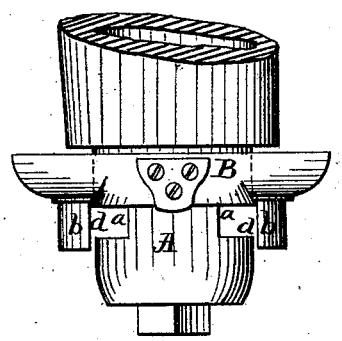
Figure 3:
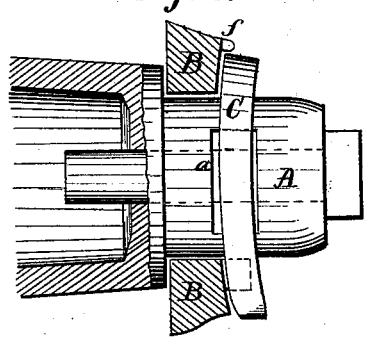
Figure 4:
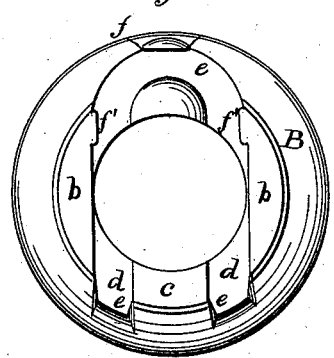

Figure 1 is a plan or top view of axle, washer, and key. Fig. 2 is a side view. Fig. 3 is a longitudinal section of same. Fig. 4 is a plan view of axle and washer with key removed.

Similar letters of reference indicate like parts in the several figures.

A represents the outer end of an axle or thimble-skein, into which are formed channels *a a*. Over this end is placed a washer, B. This washer has cast or otherwise formed upon it two lugs, *b b*, and a third lug, *c*. This last-mentioned lug is placed in such position as to leave channels or ways *d d*. Between it and the lugs *b b*, and onto the washer B, are cast projections *e e*, forming suitable bearings for the key hereinafter mentioned. The washer B being placed as above stated, or over the end A of the axle or thimble-skein, a bifurcated or U-shaped key, C, is passed between the lugs *b* on the washer, and through the channels *a a* of the axle A, in this way keying or holding the washer and axle or thimble-skein together, the lugs on the washer and the channels in the end of the axle forming a complete bearing or key-seat for the key, the projections *e e* affording proper bearing-surface on which the key rests. This key is not only U-shaped, but it is curved, as shown in Fig. 3, so that, as the key is inserted, it not only has a certain amount of elasticity, which will retain it in position in the channels and lugs, but its curvature, when the key is in position, causes it to bind or tightly fit between the end of the axle and the washer, preventing lateral play and wear.

To insure the keys not jolting out, a projection, *f*, may be cast or otherwise formed on the upper side of the washer B, against which the upper or curved end of the key C comes in contact; or ears *f' f'* may be formed on the upper ends of the lugs *b b*, (see Fig. 4,) which will serve also to keep the key in place in the washer when it is removed.

Figure 5:
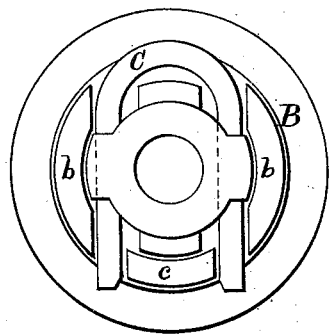

In Fig. 5 is shown a modified form of axle or skein, which consists in making lateral flanges on it for engagement with the key.

It is apparent from the foregoing description of the construction and operation of our improved axle and thimble-skein that by their use a wheel may be confined to its proper position on the axle or skein with certainty, and in a manner that will not increase but lessen the cost of construction.

Having thus described our invention, what we claim as new, and desire to secure by Letters Patent, is—

The combination of the channeled axle or thimble-skein A, the washer B, having a curved face and lugs, *b c f*, channels *d*, and projections *e*, and the curved spring-key C, all constructed to interlock, substantially as described.

GEORGE SUTTON GARTH.
WILSON ELDER.

Witnesses:
JAMES STIVER,
ABBOTT B. GARTH.